United States Patent [19]

Wilson

[11] 4,235,639

[45] Nov. 25, 1980

[54] CHROME PIGMENT

[75] Inventor: Philip Wilson, Manchester, England

[73] Assignee: Imperial Chemical Industries Limited, London, England

[21] Appl. No.: 42,338

[22] Filed: May 25, 1979

[30] Foreign Application Priority Data

Jun. 13, 1978 [GB] United Kingdom ............... 26788/78

[51] Int. Cl.³ ........................... C09C 1/14; C09C 1/20; C09C 3/06
[52] U.S. Cl. .................................... 106/298; 106/296; 106/300; 106/302; 106/303; 106/306; 106/308 B
[58] Field of Search ........... 106/298, 303, 302, 308 B, 106/296, 306

[56] References Cited

U.S. PATENT DOCUMENTS

| | | | |
|---|---|---|---|
| 3,656,986 | 4/1972 | Buckley et al. ....................... | 106/302 |
| 4,046,588 | 9/1977 | Einerhand et al. ............... | 106/303 X |

FOREIGN PATENT DOCUMENTS

| | | | |
|---|---|---|---|
| 172623 | of 0000 | Belgium . | |
| 179814 | of 0000 | Belgium . | |
| 1952537 | 11/1971 | Fed. Rep. of Germany ........... | 106/298 |
| 2028853 | 12/1971 | Fed. Rep. of Germany ........... | 106/298 |
| 45-10627 | 4/1970 | Japan ....................................... | 106/298 |

*Primary Examiner*—Helen M. McCarthy
*Attorney, Agent, or Firm*—Cushman, Darby & Cushman

[57] ABSTRACT

A process for the preparation of a treated chrome pigment which comprises precipitating antimony on to the surface of the pigment in the presence of a solution of metaphosphate ions.

8 Claims, No Drawings

CHROME PIGMENT

This invention relates to a process for the preparation of a treated chrome pigment and to the treated chrome pigment.

According to the present invention there is provided a process for the preparation of a treated chrome pigment which comprises precipitating antimony, in the form of its oxide, on to the surface of the pigment in the presence of metaphosphate ions.

As chrome pigments there are meant for example primrose yellows, comprising rhombic mixed crystals of lead sulphate and chromate, lemon yellows, comprising monoclinic mixed crystals of lead sulphate and chromate, middle yellows, comprising monoclinic crystals of lead chromate, and scarlets, comprising pseudo-tetragonal mixed crystals of lead sulphate, molybdate and chromate.

The antimony is preferably in the trivalent state and is believed to be precipitated in the form of the trivalent oxide $Sb_2O_3$ which may be in a hydrated form. It may be precipitated from a solution containing complexing agents such as fluoride ions or hydroxy aliphatic acids, e.g. citric acid. The soluble antimony for use in the process may conveniently be provided in the form of a chloride or fluoride.

The metaphosphate ions may be provided by any soluble metaphosphate salt or metaphosphoric acid itself, a suitable material being sodium hexametaphosphate sold under the trade name "Calgon PT".

The proportion of antimony, as $Sb_2O_3$, on the treated pigment is preferably from $\frac{1}{2}$ to 5% by weight based on the total weight of pigment.

Before the pigment is coated with the antimony it may be given one or more standard pretreatments such as the application of a silica and/or a titania coating.

The process of the present invention particularly when combined with other standard pre-treatments produces a chrome pigment having an improved resistance to attack by sulphur dioxide when compared with the precipitation of antimony without the presence of metaphosphate ions.

The resistance to attack by sulphur dioxide may be further enhanced by precipitating an insoluble metal metaphosphate on to the pigment at the same time as or immediately after the above-mentioned treatment with antimony in the presence of metaphosphate ions. As examples of suitable metals there may be mentioned aluminium and calcium and more especially barium, zinc and cerium(III).

The quantity of metal metaphosphate precipitated on to the pigment is also preferably in the range $\frac{1}{2}\%$ to 5% by weight based on the total weight of the pigment. Although greater or lesser quantities may be used the effects achieved are not generally commensurate with the savings or extra cost involved.

The quantity of metaphosphate ions should be at least sufficient to take up all the metal ions with which they are to be precipitated but may conveniently extend upwards to the stoichiometric equivalent of the sum of the antimony and the other metal ions present before precipitation. A suitable range is from 0.5% to 10% and more preferably from 0.5% to 5% by weight based on the total weight of the pigment.

The pigment coated with metal metaphosphate in this manner frequently has a markedly lower soluble lead content as measured by "The Specification for lead chromes and zinc chromes for paints", BS No. 282: 1963, the so-called "Home Office" test. In the case of lemon, primrose and scarlet chromes, the reduction in soluble lead content can be further enhanced by an additional treatment of the pigment before any coating is applied. This pre-treatment comprises the addition to the pigment slurry, immediately after the "strike" (pigment precipitation) and ageing process, and before it has received any coating of a water-soluble chromate salt until the concentration of lead in the slurry is at or below 0.001 M. In some cases this pre-treatment combined with the process of the invention will permit the preparation of a chrome pigment which passes the "Home Office" test; whereas it would otherwise fail this test.

According to a further feature of the invention we provide a treated chrome pigment carrying a superficial coating of antimony oxide precipitated from a slurry containing metaphosphate ions. The treated chrome pigment may carry other superficial coatings such as are described herein or are known to those skilled in the art.

The invention will now be illustrated by the following examples in which all the parts and percentages are by weight unless otherwise stated.

EXAMPLE 1

A lemon yellow chrome pigment is prepared as follows:

To a solution of 362.2 parts of $Pb(NO_3)_2$ in 4800 parts of water at a pH of 4 and 20° C. is added a solution of 118.5 parts of $Na_2Cr_2O_7$, 75.4 parts of NaOH (35% liquor), 30.5 parts of $Na_2SO_4$ and 8.8 parts of NaCl in 1200 parts of water at 20° C. The pH of the pigment slurry so formed is 5.70. The temperature is then raised to 55° C. over 30 minutes following which period a solution of sodium chromate is added until the soluble lead is less than 0.001M as measured by precipitation with potassium iodide.

A titania coating is then applied by adding a solution of $Ti(SO_4)_2$ in conc.sulphuric acid until the pH reaches 2.6. The slurry is then allowed to settle and the liquor decanted and replaced with an equivalent volume of water. The temperature is then raised to 65° C. and 42.4 parts of $Na_2SiO_3$ is added. The pH is then slowly reduced by the addition of 42.4 parts of $(NH_4)_2SO_4$ over 15 minutes followed by 28.0 parts of $SbCl_3$ and 8 parts of citric acid in 50 parts of hot water. This reduces the pH to about 1.6. At this stage 36.0 parts of $ZnSO_47H_2O$ are added followed by the slow addition over 45 minutes of a solution of 24.0 parts of sodium hexametaphosphate and 14.0 parts of sodium carbonate in 500 parts of hot water. The pH at the end of the process is 4.4.

The pigment is then isolated in a conventional manner and the soluble lead content, as determined by the "Home Office" test, found to be 5.8%.

EXAMPLE 2

A titania coated lemon chrome pigment is prepared according to the procedure used in Example 1 except that 79.0 parts of NaOH liquor was used in place of the 75.4 parts of NaOH liquor used in Example 1.

After washing by decantation, as in Example 1, 42.4 parts of $Na_2SiO_3$ are added to the slurry and the pH is reduced by the addition of 2.4 parts of $NH_4Cl$ followed by a solution of 28.0 parts of $SbCl_3$ and 8.0 parts of citric acid in 50 parts of hot water. This reduces the pH to 1.3. There is then added 32 parts of $BaCl_22H_2O$ followed by a solution of 24 parts of sodium hexametaphosphate and 12 parts of sodium carbonate in 500 parts of hot water over a period of 45 minutes. The pH of the slurry is 5.30. The pigment is isolated in the usual manner and the soluble lead content, as determined by the "Home Office" test, found to be 3.7%.

EXAMPLE 3

A middle yellow chrome pigment is prepared as follows:

To a solution of 48.7 parts of $Na_2CR_2O_7$ and 27.0 parts of NaOH liquor in 1200 parts of water at 20° C. and pH 8.0 is added a solution of 109.8 parts of $Pb(NO_3)_2$ in 440 parts of water at 20° C. and pH 3.9 until the pH reaches 6.6. The temperature is then raised to 55° C. over 30 minutes and the pH raised to about 8.5 by the addition of 1 part of NaOH liquor. $Pb(NO_3)_2$ is then added until a very slight lead excess is measured using 10% $Na_2S$ as indicator.

The pigment is coated with titania by the addition of 1.6 parts of $Ti(SO_4)_2$ in conc. $H_2SO_4$, reducing the pH to about 2.5, and washed by decantation as in Example 1.

A silica coating is applied by the addition of 12 parts of $Na_2SiO_3$ followed by the slow addition, over 10 minutes, of 12 parts of $NH_4NO_3$ in 120 parts of water. The pH at this stage is 7.5. The pH is then reduced to 1.6 by the addition of 12 parts of $SbCl_3$ and 3 parts of citric acid in 40 parts of hot water followed by 5 parts of solid $BaCl_2 2H_2O$. The antimony coating is effected by the slow addition (over 30 minutes) of 3.8 parts of sodium hexametaphosphate and 3.8 parts of sodium carbonate in 150 parts of hot water which raises the pH to 4.2.

The pigment is isolated in the conventional manner. The soluble lead content of the isolated pigment is found to be 0.6%, by the "Home Office" test.

I claim:

1. A process for the preparation of a treated chrome pigment comprising precipitating antimony trioxide onto the surface of the pigment in the presence of a solution of metaphosphate ions, wherein the quantity of metaphosphate ions in the solution is from 0.5% to 10% by weight, based on the total weight of the pigment.

2. A process according to claim 1 wherein the antimony is precipitated from a soution containing a complexing agent.

3. A process according to claim 2 wherein the complexing agent is selected from fluoride ions and hydroxy aliphatic acids.

4. A process according to any one of claims 1, 2 or 3 wherein the proportion of antimony on the treated pigment is from ½% to 5% by weight, as $Sb_2O_3$, based on the total weight of the pigment.

5. A process according to any one of claims 1, 2, 3 or 4 wherein there is simultaneously or subsequently deposited on to the pigment an insoluble metal metaphosphate.

6. A process according to claim 5 wherein the metal is selected from barium, zinc and cerium(III).

7. A process according to claim 4 or claim 5 wherein the quantity of metal metaphosphate precipitated on to the pigment is in the range ½% to 5% by weight, based on the total weight of the pigment.

8. A treated lead chrome pigment carrying a superficial coating of antimony oxide precipitated from a slurry containing metaphosphate ions.

* * * * *